Figure 1:
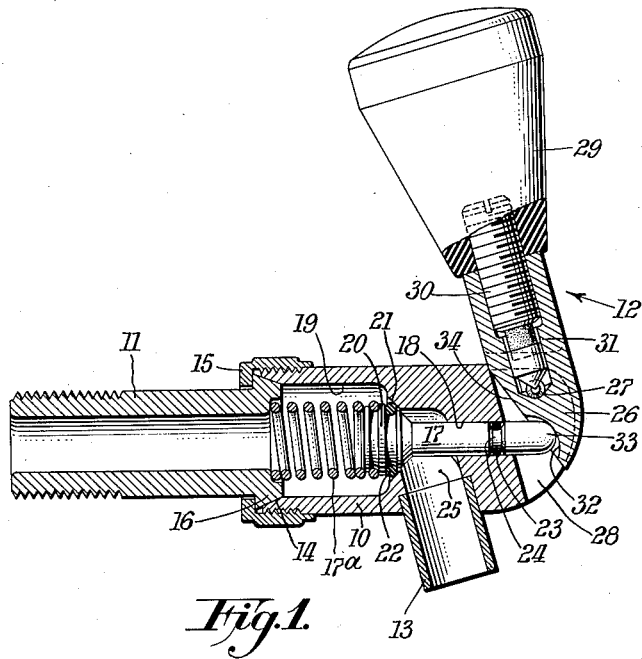

Dec. 18, 1951  R. E. GORDINIER  2,578,797
LIQUID VALVE
Filed Oct. 8, 1947

Inventor
Ralph E. Gordinier
By
Agent

Patented Dec. 18, 1951

2,578,797

UNITED STATES PATENT OFFICE 2,578,797

LIQUID VALVE

Ralph E. Gordinier, Quakertown, Pa., assignor to Economy Faucet Company, Newark, N. J., a corporation of New Jersey Application October 8, 1947, Serial No. 778,656

2 Claims. (Cl. 251—134)

The present invention relates to improvements in liquid valves and particularly to valves which are intended for use in dispensing liquids for human consumption.

Liquid valves or dispensers must operate easily and surely; and for sanitary reasons they must be readily disassembled for cleaning. Accordingly, it is the principal object of this invention to provide a valve of this kind having but few component parts which may easily and quickly be assembled or disassembled without the use of special tools, which may be thoroughly cleaned, and which also may be readily opened, adjustably held open and securely closed against the pressure of the liquid in the container or fluid line to which it is attached.

In accomplishing these objects, many of the moving parts of the valve of my invention are located on the outside of the valve body and consequently they do not come in contact with the material passing therethrough. Within the valve body I have eliminated all sharp corners and inside threads so that cleaning of the valve parts which are in contact with the fluid materials may be complete. Likewise, the interior of the valve is constructed so that when certain parts are removed, brushes or other cleaning instrumentalities may be passed entirely therethrough. The mechanical arrangement of the parts within the valve body is extremely simple so that manipulation, assembly, disassembly, and repairs or replacements, may be handled by inexperienced persons.

I have not sacrificed any of the normal functions of a valve of this type, in fact, I have provided an efficient valve structure, parts for which may be readily fabricated with standard tools from standard shapes or from castings or forgings requiring a minimum of preparatory tooling.

The accompanying drawing is illustrative of the preferred physical embodiment of my invention. It will be obvious that various changes may be made in the component parts and in the materials used in their construction which are within the scope of my invention as defined in the appended claims.

Figure 2:
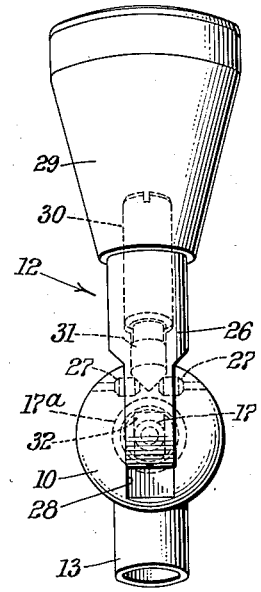
Figure 3:
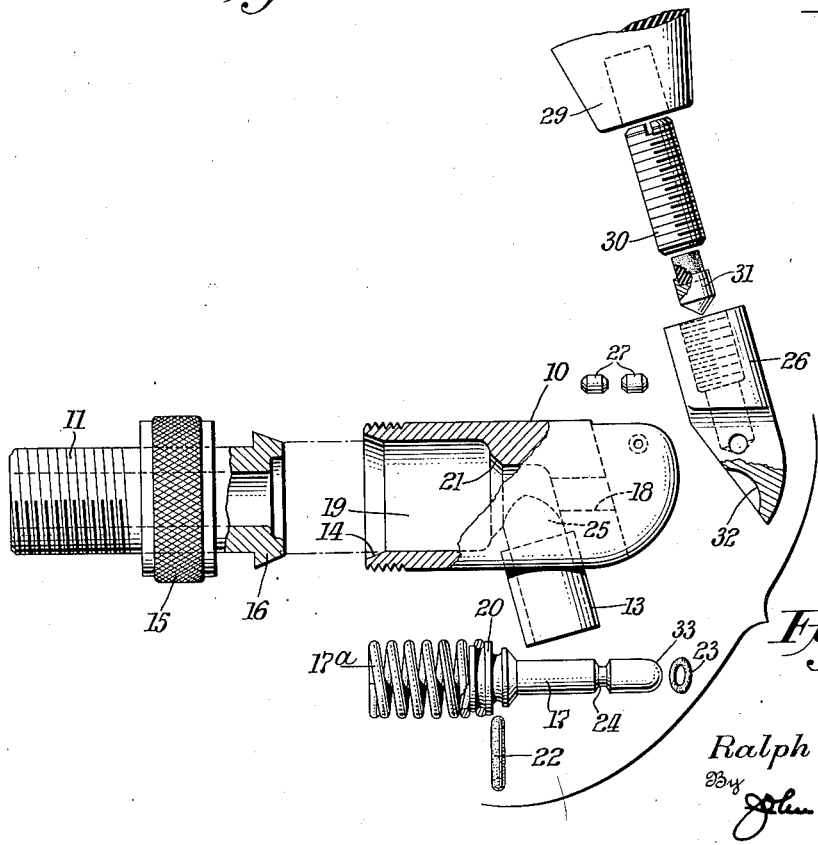

Referring to the drawing,

Figure 1 is a side elevation view, partly in cross-section, showing the assembly of a dispensing valve according to my invention, Figure 2 is an elevation view from the right hand end of the valve of Figure 1, and Figure 3 is an exploded view, partly cross-sectioned, of the components of the valve of my invention, illustrating the simplicity of assembly and disassembly thereof.

In Figure 1, numeral 10 indicates a cast or forged metallic valve body or casing to which are assembled a separable tubular metal tail piece 11, a manipulating handle 12, a fixed discharge spout 13, and interior valve closure parts to be later described in detail. Non-corrosive metals such as stainless steel are preferably used in the construction of the parts for my valve or, alternatively, nickel or chrome plated metals or metals otherwise suitably treated on their surfaces to avoid corrosion and contamination may be substituted if desired. A liquid-tight tapered joint 14 is provided between the valve body 10 and the tail piece 11, and a nut 15 threadedly engaged with body 10 grips the flange 16 on tail piece 11 to hold it securely in place against the valve body 10. The tail piece has an inside diameter of a suitable size to convey liquid to the valve proper and it is screw threaded on its left hand end so that it may be connected to an adjoined pipe-line or fixture from which liquid is conveyed to the valve. It will be noted at this point that the threads on the valve body and, likewise, those on the tail piece, are on the outside surface of these members and that they will not be in communication with liquid flowing through the valve. Thus, I avoid any contamination of the dispensed liquid with foreign matter which might otherwise inadvertently become lodged in sharp corners at the base of the threads.

A valve stem 17 centrally disposed within the valve body 10 is fitted to slide horizontally with respect thereto, being carried in a suitable bore 18 which extends from the interior of the valve body through the right hand end wall, at the same time projecting beyond the body opening for a short distance in order to cooperate with the manipulation lever 12, as will be hereinafter described. Liquid entering the valve from within the tail piece 11 and thence passing through the inlet aperture 19 adjacent the tapered joint 14 is normally restrained from flowing through the valve by a sealed annular joint effected between the enlarged head portion 20 of valve stem 17 and the valve seat 21 within the valve body adjacent inlet port 19. An hermetic seal is made at the valve seat by the use of a resilient washer 22, of circular transverse cross-section, which is retained in a semi-circular groove in the enlarged head portion 20. A smaller resilient washer 23, also of circular cross-section, is located in a tapered annular groove 24 in the valve stem 17 to prevent liquid from passing out of the valve through the clearance space between the stem and stem opening. Valve stem 17 is yieldingly urged to closed position by the compression spring 17a fitted between the end surface of the tail piece 11 and an aligning groove under the enlarged head portion 20 of the stem.

Projecting downwardly from within the valve body at an angle to the central axis of the valve stem and to the right of valve seat 21 is a communicating outlet aperture 25 which directs fluid passing through the valve past the valve seat outwardly of the valve through the spigot 13. The inside diameter of the spigot 13 coincides precisely with the mating inside diameter of aperture 25 and substantially inside radius corners are used within the aperture thus avoiding any niches or recesses in which foreign matter might accumulate which would be difficult of cleaning.

The manipulation lever assembly 12, at the right, is constructed of several pieces comprising principally the metal stem presser member 26 and a non-metallic handle or knob 29. Joining the presser member and the handle is a threaded headless stud 30 which engages tapped holes provided in the two parts. Presser member 26, Figure 2, is guided between the parallel sides of a slot 28 cut in the end of body 10 and it is pivoted therewith by means of a pair of small cylindrical pins 27, suitably trunnioned in apertures in member 27 and body 10, the pins 27 being chamfered at their ends to be separated laterally by the conical end of a bearing plug 31 located within the stem presser member 26 and adjustably confined therein by stud 30. Plug 31 may, as shown, be constructed mainly of metal having a somewhat resilient non-metallic insert portion for contacting stud 30 in order that uniform lateral pressure will be maintained by pins 27 against their counter-sunk bearing apertures in body 10.

The exploded view of Figure 3 shows the component parts of the valve when disassembled. Thus, when the valve has been taken apart, it is a very easy matter to thoroughly clean the interior surfaces of the valve body and the tail piece since, wherever possible, the inside corners are rounded and no obstruction is presented to the passage of a brush or other cleaning instrumentality straight through the valve body and out of opening 18 or angularly through the body from the spigot opening. It will also be observed that an equally simple cleaning operation may be performed on the valve stem since all inside corners are rounded and no location exists where dirt or foreign matter may accumulate and be difficult of removal. The spring 17a may also be removed from the valve stem 17 for thorough cleaning merely by detaching the end convolution from its semi-circular holding groove in the stem.

Thereafter, in reassembling the structure, the valve stem with the spring and washers 22 and 23 assembled may first be inserted in the valve body and the tail piece drawn-up with nut 15 to effect a sealed joint between the tail piece and the body. At the same time the spring 17a is partially compressed to maintain the valve in normally closed position. The valve stem presser member 26 is then fitted within the slot 28 with the small pins 27 inserted in their bearing aperture within the confines of member 26. Thereafter plug 31 is dropped in place and stud 30 is screwed down to spread the pins apart and to adjust the pivot pressure, after which, handle piece 29 is threadedly attached to the exposed portion of stud 30. For dispensing fluid through the valve an operator merely pivots the handle clockwise whereupon the undercut portion 32 of the presser member 26 contacts the rounded end 33 of valve stem 17 to move the stem at the left against spring pressure. Full opening of the valve is effected when the angularly disposed face 34 of presser member 26 strikes against the bottom surface of slot 28. When handle 12 is released, the spring pressure, aided by any pressure of fluid against the head portion 20 will close the valve against further transmission of liquid through the communicating openings and out of the valve. If, in operation of the valve, it is desired to have the valve remain open rather than to have it normally closed by spring pressure, then the frictional pivot pressure may be increased by tightening down stud 30 to a desired degree, whereupon opening and closing of the valve will both be manual operations. In the normal mounting position as shown in Figure 1, all residual liquid which had passed the valve seat will flow out of the valve by gravity.

I claim:

1. In a liquid valve, in combination, a valve body having an opening therein for the passage of liquid therethrough, a valve stem adapted to be positioned with respect to the valve body to open or close the said liquid opening, spring means to urge the valve stem toward its closed position, a manipulating handle to move the valve stem to open position, axially aligned but mutually separable pivot pins bottoming in opposite sides of the valve body and pivotally joining the body with the manipulating handle, said pins, when separated, being adapted to assume binding contact with respect to the body, and thrust means carried by said handle to engage said pins and to separate them into binding contact with the body and to thereby increase the frictional resistance of the pivotal connection.

2. In a liquid valve, in combination, a valve body having an opening therein for the passage of liquid therethrough, a valve stem adapted to be positioned with respect to the valve body to open or close the said liquid opening, spring means to urge the valve stem toward its closed position, a manipulating handle to move the valve stem to open position, axially aligned but mutually separable pivot pins bottoming in opposite sides of the valve body and pivotally connecting the body with the manipulating handle, said pins, when separated, being adapted to assume binding contact with respect to the body, a thrust plug within said handle to wedge between said pins, and screw threaded means carried by said handle in abutment with said plug whereby said plug may be adjustably wedged between said pins to correspondingly vary the frictional resistance of said pivotal connection.

RALPH E. GORDINIER.

REFERENCES CITED

The following references are of record in the file of this patent:

UNITED STATES PATENTS

| Number | Name | Date |
|---|---|---|
| 344,171 | Campos | June 22, 1886 |
| 1,954,662 | Bond | Apr. 10, 1934 |
| 2,067,445 | Ginter | Jan. 12, 1937 |
| 2,087,223 | Thompson | July 13, 1937 |
| 2,164,927 | Kohler | July 4, 1939 |
| 2,281,737 | Woelfer | May 5, 1942 |
| 2,408,541 | Wilson | Oct. 1, 1946 |